(No Model.)

J. JOHNSON.
CAR HEATER.

No. 253,389. Patented Feb. 7, 1882.

Attest:
Courtney A. Cooper
H. E. Hansmann

Inventor:
Jonathan Johnson
By his attorney
Charles E. Foster

UNITED STATES PATENT OFFICE.

JONATHAN JOHNSON, OF LOWELL, MASSACHUSETTS.

CAR-HEATER.

SPECIFICATION forming part of Letters Patent No. 253,389, dated February 7, 1882.

Application filed October 18, 1881. (No model.)

*To all whom it may concern:*

Be it known that I, JONATHAN JOHNSON, a citizen of the United States, and a resident of Lowell, Middlesex county, State of Massachusetts, have invented certain Improvements in Railway-Car Heaters, of which the following is a specification.

My invention relates to that class of heaters in which the heating is effected by radiation from tubes or casings through which heated water is caused to circulate; and my invention consists in the construction and arrangement of parts hereinafter fully set forth, whereby to secure an unobstructed circulation, rapidly and thoroughly heat the water, reduce loss of water by evaporation, and maintain the supply of water in the pipes.

Figure 1:
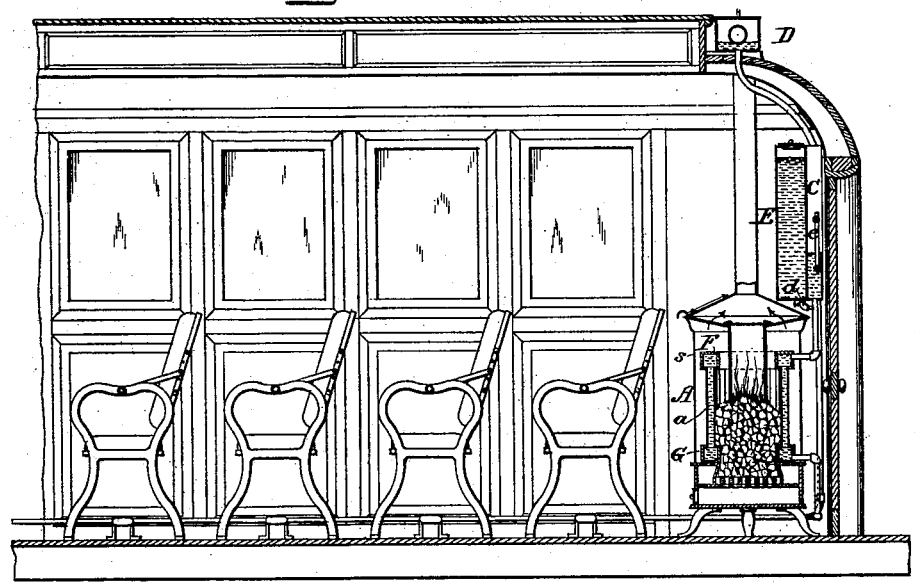
Figure 2:
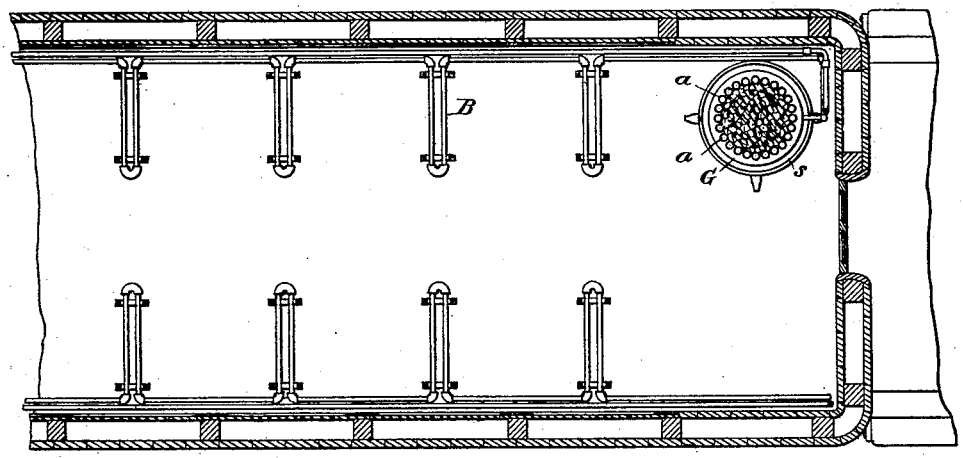
Figure 3:
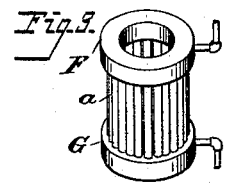

In the accompanying drawings, Figure 1 is a longitudinal section of sufficient of a railway-car to illustrate my invention. Fig. 2 is a sectional plan; Fig. 3, a perspective view of the fire-pot.

The heating apparatus consists of the stove or furnace A, the circulating and radiating pipes B, the separator casing, vessel, or chamber C, and condenser D, and with these I combine a water or supply reservoir tank, E. The furnace is a casing of any suitable construction, (for instance, a sheet-iron cylinder, *s*, containing a fire-pot,) the side walls of which are tubes *a a*, arranged to leave intervening spaces, but of such slight width that the body of fuel, until reduced to fine ashes, cannot pass laterally from the pot. The tubes *a* communicate at the top and bottom with annular casings F G, and the fire-pot and water-receptacle thus formed is placed in the water-circulation, the burning fuel and gases in direct contact with the water-receptacles imparting a high degree of heat, and the water flowing readily upward as it becomes heated without any interference with the circulation, so that the heating is effected with great rapidity. As the water-tubes *a* are separated, the gases may pass between the same and are confined by the outer casing, *s*, around the tubes, thereby heating the latter at all points, while the heated gases can pass directly to all parts of the mass of fuel at the sides, insuring a thorough and perfect combustion.

The radiating and circulating pipes B communicate with the lower and also with the upper annular casings, and are bent, as shown, to form radiators extending beneath the seats, or they may communicate with radiating-casings of any suitable character and arrangement. In the line of the upper portion of the circulating-pipes is placed the vessel C, into which the water flows to a height proportioned to the quantity introduced from the supply-tank E, which communicates with either the tube or vessel through a passage provided with a cock, *d*. A gage, *e*, indicates the height of the water in the vessel. As the heated water flows from the furnace into the vessel C it carries with it particles of steam, which in the vessel C are separated from the liquid and rise so that the liquid flows through the pipes without carrying with it steam to form traps or obstructions. The steam rises from the upper part of the separating-chamber into the condenser D, which is placed outside the car, and consists of a vessel having an extended surface, but open freely to the atmosphere and to the separator, so the steam will be rapidly condensed, and any uncondensed vapor escapes freely, the liquid flowing downward to the circulating system. By this means the circulation is effected without the slightest pressure, so that light inexpensive pipes capable of being quickly heated and of transmitting the heat readily may be used, while there is but little loss from evaporation, and any such loss may be instantly supplied by the manipulation of the cock *d*.

I do not limit myself to any special construction and arrangement of the separating-vessel or condenser, nor to the precise arrangement of the tubes *a* and casings F and G, as these may all be varied. Thus the upper casing, F, may be dome-shaped, and the lower may form part of the stove-casing. It is important, however, that the water be thoroughly distributed to all the tubes, and that there be no impediment to the circulation, so that the water may pass freely and rapidly over to and away from the heated surfaces, thereby preventing overheating and the burning out of the metal.

Although I have shown my heater arranged in a car, it is equally adapted for heating dwellings and for other purposes.

I am aware that vertical circulating-pipes have been placed in fire-pots; but in all such cases they have been separated, so as to require intervening strips of fire-clay to complete the fire-pot; or they have been so arranged that the straight upward circulation through the whole body of pipes has not been possible.

I am also aware that outside condensers have been proposed with systems for circulating water under pressure. My improvement is distinguished from the latter mode by the fact that I condense the steam while circulating the water without any pressure whatever.

The use of a water-gage as above described is important, inasmuch as it is essential to maintain all the pipes full of water to secure the circulation, prevent the rapid generation of steam and the burning out of the parts of the fire-pot.

My invention must be distinguished from appliances for heating heretofore employed, as in my heater patented August 27, 1878, where the separating-chamber is not open to the air, by the fact that I secure the desired rapid circulation of the water without the use of any pump or other circulating device, and thereby convey the heat rapidly and effectively to the most remote part of the car without the necessity of employing steam-pressure, which is not only dangerous, but requires the use of heavy pipes that are expensive and interfere with the free transmission of heat. I secure the requisite rapid heating of the water without actually converting it into steam, and thus dispense with a pump by the use of the vertical pipes so arranged as to hold the body of the fire which is in actual contact therewith throughout their length, and so as to permit the air to pass to the sides of the fire, maintaining a rapid combustion while the heated gases circulate around the outsides of the pipes. I avoid steam-pressure by keeping the circulating system open to the air, but prevent any great loss of steam by combining with the circulating-pipes a condenser that will insure the condensation of any steam that forms in the pipes; and by arranging this condenser above the separating-tank all the steam passes thereto, warming the feed-water in its passage, without being carried into the circulation.

I claim—

1. In a hot-water heater, a stove provided with a space around the fire-pot to receive the heated gases, and with a fire-pot consisting of separate vertical pipes $a$, arranged to leave intervening air-passages and to hold the body of the fuel, and upper and lower water-chambers, F G, communicating with said pipes and with the outlet and inlet branches of a circulating and radiating system open to the air, all as specified.

2. The combination, with the circulating and radiating system of water-pipes open to the air, of a heater containing a fire-pot with vertical pipes exposed to the fuel, arranged to insure the passage of air between the same and a free, rapid, and straight upward flow of the water without pressure from the lower to the upper circulating-pipes and through the latter, as specified.

3. The combination with the stove, its fire-pot having vertical water-channels, water circulating and radiating pipes, and casing C, open at the top and arranged in the line of the water-circulation, as specified.

4. The combination of the circulating and heat-radiating pipes, heater, casing C, and condenser communicating with said casing and with the air, as set forth.

In testimony whereof I have signed my name to this specification in the presence of two subscribing witnesses.

JONATHAN JOHNSON.

Witnesses:
E. T. V. ANTHONY,
J. R. PRESCOTT.